April 14, 1925.

C. MENDLER

SECURING DEVICE

Filed Oct. 23, 1922

1,533,565

Inventor
Charles Mendler
By
Atty.

Patented Apr. 14, 1925.

1,533,565

UNITED STATES PATENT OFFICE.

CHARLES MENDLER, OF SAN FRANCISCO, CALIFORNIA.

SECURING DEVICE.

Application filed October 23, 1922. Serial No. 596,476.

*To all whom it may concern:*

Be it known that I, CHARLES MENDLER, a citizen of the United States, residing in the city and county of San Francisco and State of California, have invented a new and useful Improvement in Securing Devices, of which the following is a specification.

My invention relates to improvements in securing devices, and particularly to an improved construction and arrangement of gripping edges for engaging a shank.

The primary object is to provide an improved securing device.

Another object is to provide an improved arrangement of the gripping edges of a clamping element to increase the effectiveness thereof.

A further object is to provide an improved construction whereby a shank may be engaged at a plurality of substantially diametrically opposed points to give stability and a greater frictional resistance to movement.

A still further object is to provide an improved device of the character described adapted to increase the effectiveness of engagement and to facilitate the release for removal when desired.

I accomplish these and other objects by means of the device disclosed in the drawings forming a part of the present specification wherein like characters of reference are used to designate similar parts throughout said specification and drawings, and in which.

Figure 1:
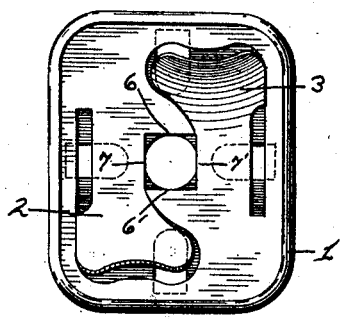
Fig. 1 is a front elevation of my improved securing device.
Figure 2:
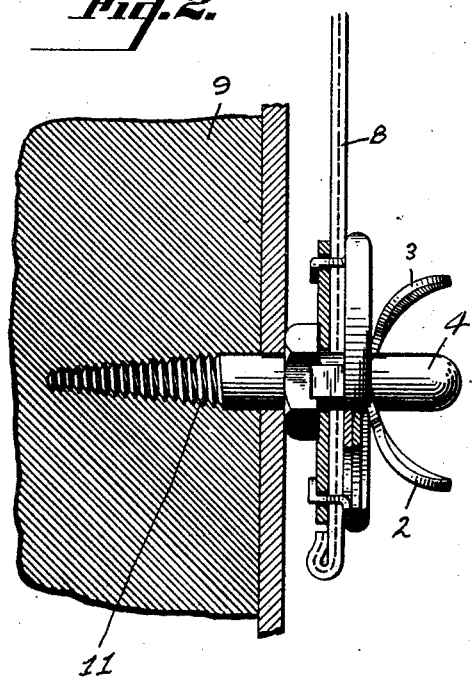
Fig. 2 is a side elevation, partly in section showing the securing device mounted in operative engagement with a shank.
Figure 3:
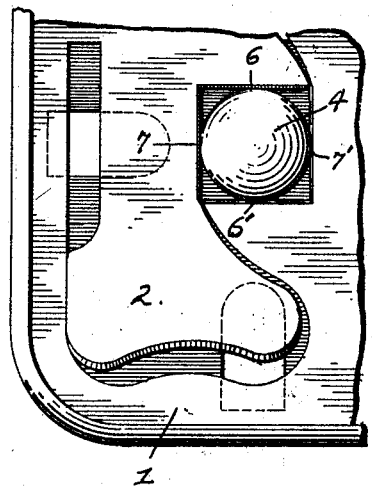
Fig. 3 is an enlarged broken front elevation showing the manner in which a shank is engaged.

Referring to the drawings, the numeral 1 is used to designate in general a securing element having a pair of spring clamping elements 2 and 3 arranged to frictionally engage a shank 4. This invention is an improvement upon the devices disclosed in my former patents numbered 1,412,480 and 1,412,481, and application filed August 3rd, 1922, Serial No. 579,463, the improvement residing in the manner in which the clamping elements are constructed and arranged to engage the shank.

In my former inventions referred to the clamping elements were provided with recesses arranged to form an aperture of a diameter slightly less than the diameter of the shank, said recesses forming an arcuate gripping edge upon each clamping element to frictionally engage the shank. This construction is improved in my present invention by replacing the recesses mentioned by notches having angularly disposed sides 6 and 7 preferably arranged at substantially right angles to form gripping edges upon each clamping member, the edges 6 and 7 of one member opposing corresponding edges 6' and 7' formed upon the other clamping element. The distance between corresponding gripping edges 6 and 6' and 7 and 7' is made slightly less than the diameter of the shank 4 to be engaged thereby so that when the securing member 1 is forced over the shank the clamping elements will be sprung outwardly and the shank firmly engaged between the corresponding gripping edges.

In my former construction, when the clamping elements are sprung outwardly to receive the shank, the arcuate edge of the recess becomes so inclined as to engage the shank at one point only. This results in restricting the effective gripping surface to a very small area and permits a slight pivotal movement of the securing member about the points of engagement with the shank.

My improved construction herein disclosed provides two points of engagement between each clamping element and the shank, said points opposing two similar points of engagement between the other clamping element and the shank, thus obtaining substantially double the effective area of contact. The four point engagement gives a rigid mounting that prevents any pivotal movement of the securing member relative to the shank. It will be noted that the clamping elements are so arranged to be sprung outwardly upon connecting portions substantially centered upon a line through the apex of the notches so that both gripping edges will become effective to exert a gripping pressure against the shank such that any effort to remove the member 1 will result in forcing the gripping edges into more effective engagement with the shank. When it is desired to remove the member 1 from the shank the clamping elements 2 and 3 are sprung outwardly from the shank by pressure applied upon the extreme ends of the clamping elements as in the devices disclosed in the patents above referred to, both gripping edges being thus moved to release the shank. The straight edges 6 and 7 readily disengage the shank when the clamping elements are moved outwardly, only a slight movement of the outer ends of the clamping elements being necessary to effect a clean release of the shank.

The device may be applied in a great number of ways without departing from the spirit of my invention. In the drawings I have illustrated the securing member as permanently secured upon a curtain 8 and arranged to detachably engage a shank 4 secured upon a permanent mounting 9 by means of a screw threaded portion 11, but as the means for mounting the connecting member and shank upon their respective supports forms no part of the present invention no specific description of such means is herein necessary and is therefore omitted.

Having thus described my invention what I claim as new and desire to secure by Letters Patent is:

1. In a securing device, a clamping member comprising a rim having a pair of proximate spring clamping elements formed integral therewith and having oppositely disposed notches formed in the proximate edges thereof to frictionally engage a shank inserted therebetween, the sides of said notches being angularly disposed and forming gripping seats to engage the shank at spaced points when sprung apart by said shank, to prevent longitudinal movement of said elements on said shank.

2. In a securing device, a clamping member comprising a rim having a pair of proximate spring clamping elements formed integral therewith and having oppositely disposed notches formed in the proximate edges thereof to frictionally engage a shank inserted therebetween the sides of said notches being rightangularly disposed to form gripping seats and arranged to engage the shank at a plurality of diametrically disposed points when sprung apart by said shank to prevent longitudinal movement of said elements on said shank.

In witness whereof I hereunto set my signature.

CHARLES MENDLER.